Aug. 19, 1958 J. E. THURMOND 2,847,866
MULTISPEED RECORDER TRANSMISSION
Filed Nov. 29, 1956 3 Sheets-Sheet 1
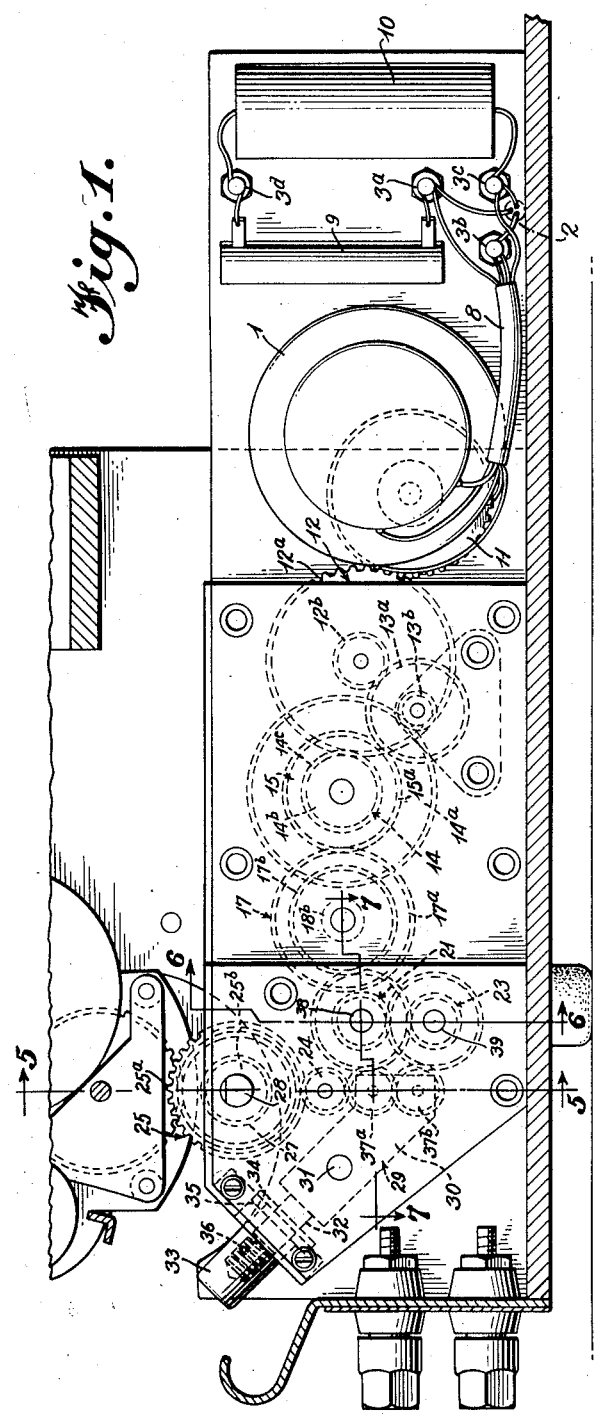
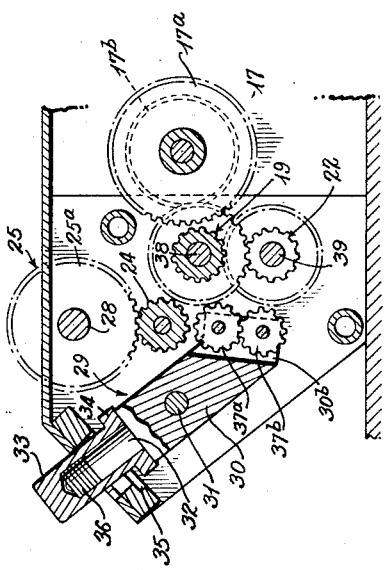
INVENTOR
James E. Thurmond
BY Stevens, Davis, Miller & Mosher
ATTORNEYS Aug. 19, 1958 J. E. THURMOND 2,847,866
MULTISPEED RECORDER TRANSMISSION
Filed Nov. 29, 1956 3 Sheets-Sheet 2
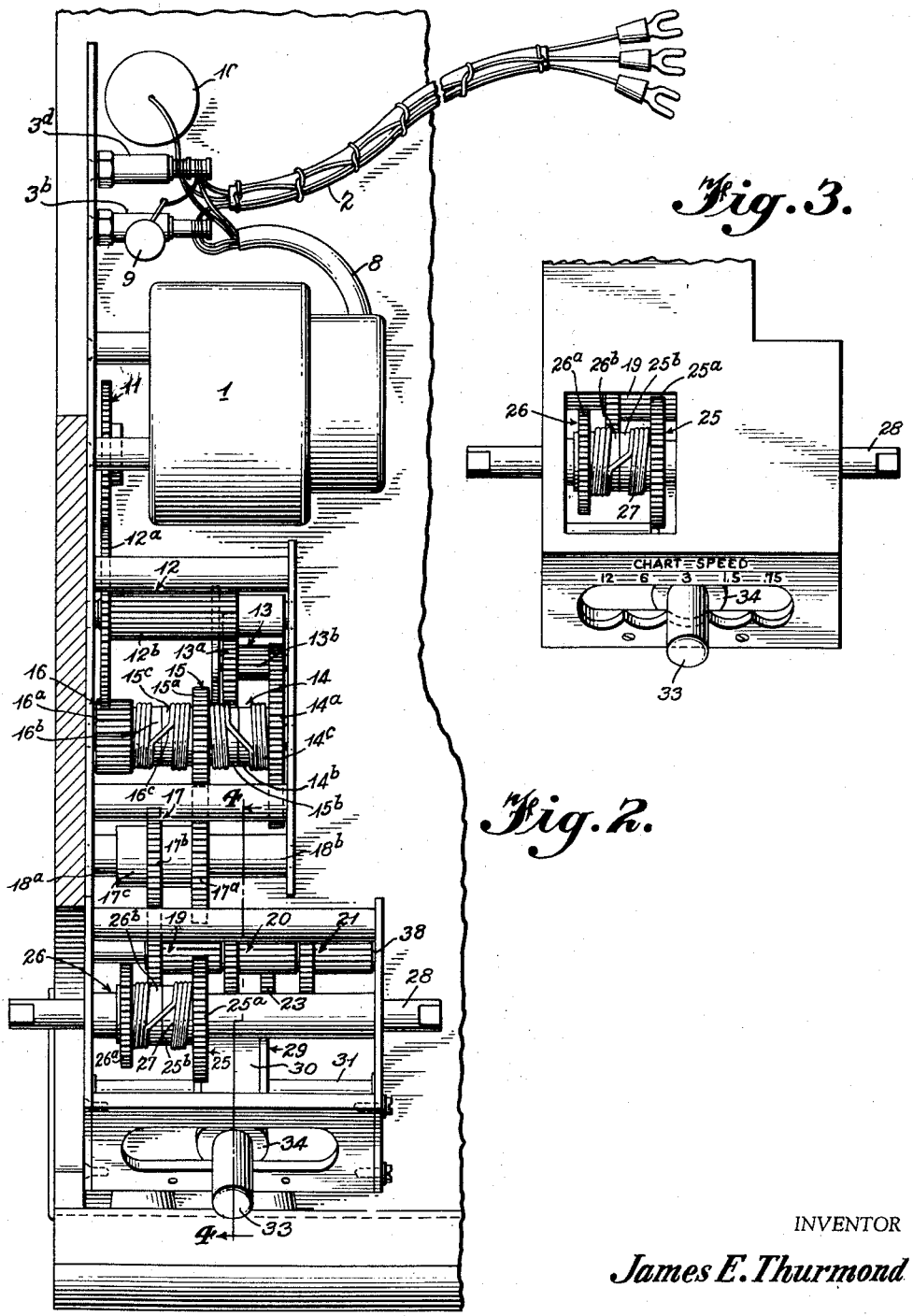
INVENTOR
James E. Thurmond
BY Stevens, Davis, Miller & Mosher
ATTORNEYS Aug. 19, 1958     J. E. THURMOND     2,847,866
MULTISPEED RECORDER TRANSMISSION
Filed Nov. 29, 1956     3 Sheets-Sheet 3

INVENTOR
James E. Thurmond
BY Stevens, Davis, Miller & Mosher
ATTORNEYS

United States Patent Office 2,847,866
Patented Aug. 19, 1958

2,847,866

MULTISPEED RECORDER TRANSMISSION

James E. Thurmond, Bellaire, Tex., assignor to Texas Instruments Incorporated, Dallas, Tex., a corporation of Delaware Application November 29, 1956, Serial No. 625,182

7 Claims. (Cl. 74—352)

This invention relates generally to gear systems, and more particularly to a novel multispeed transmission for providing unidirectional output torque at a plurality of different speeds.

In modern day instrumentation it is often necessary to ascertain the manner in which a given quantity varies with elapsed time. One type of instrument commonly employed for providing a graphic illustration of such variation includes a recording pen which traces a pattern on a supply of chart paper. Other types of instruments utilize a light beam which is focussed on a moving strip of light sensitive paper.

Input data in the form of electrical signals is applied to voltage responsive mechanism within such instruments in order to deflect the member which traces the pattern on the recording medium. Simultaneously, tractive effort is applied to the recording medium to cause it to move at a uniform rate beneath the deflecting member.

Although the rate of change of the various phenomena to be observed may vary between extremely wide ranges, many prior art instruments are capable of recording at only a single fixed speed. In other words, no apparatus is provided within the instrument for changing the linear velocity of the recording medium. As a result, swiftly changing conditions may be inaccurately recorded because of an overly slow chart speed, and minute variations in the input data thus prevented from showing up properly on the recording medium. Conversely, the recordation of substantially stable phenomena on a very rapidly moving record chart may fail to yield the optimum picture of the changes occurring in the phenomena as time elapses. It will thus be appreciated that the correlation of the chart speed with the type of data to be observed is vitally necessary in obtaining optimum recordation of the phenomenon being studied.

The present invention contemplates an ingenious multispeed transmission for correlating the recording speed with the expected rate of change of the data under consideration. In addition, the invention provides an output driving torque which remains unidirectional regardless of the direction of rotation of the drive motor.

Accordingly, therefore, a primary object of this invention is to teach a novel multispeed transmission for controlling the chart speed of a recording instrument.

Another object of this invention is to provide an ingenious gear system capable of selectively producing a unidirectional output driving torque at a plurality of angular velocities.

Still another object of the invention is to teach a method and means for utilizing spring clutches in a recorder transmission in order to provide unidirectional output torque from a gearing system driven by a reversible electric motor.

A further object of the invention is to interpose a change gear train between the reversible motor of a gearing system and the output gear, in order to supply unidirectional torque for applying tractive force to a recording medium.

These and other objects and advantages of the present invention will become evident by reference to the following detailed description and drawings, in which like numerals indicate like parts and in which:

Figure 1 is a side view of the multispeed transmission showing the interrelationships between the elements.

Figure 2 is a top plan view of the transmission with the cover plate removed.

Figure 3 is a plan view of the front of the transmission showing the manner in which the speed selection knob is maintained in position by the scalloped configuration therebeneath.

Figure 4 is a section view taken along the lines 4—4 in Figure 2, looking in the direction of the arrows, and illustrating the constructional details of the transmission shift assembly.

Figure 5:
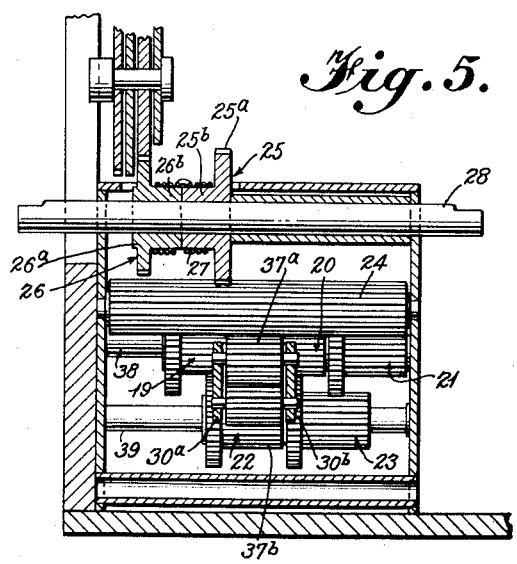
Figure 5 is a sectional view taken along the lines 5—5 in Figure 1, looking in the direction of the arrows, and illustrating a front view of the interrelationship between the five individual gear assemblies and the pair of mating pinions journaled in the transmission shift assembly.

Turning now to the drawings and more particularly to Figure 1 thereof, the numeral 1 indicates a drive motor which is adapted to supply the driving torque for the multispeed transmission. The drive motor 1 may comprise a reversible synchronous single-phase motor adapted to rotate either clockwise or counter-clockwise.

Electrical energy is supplied to the drive motor via the input power cable assembly 2. A total of four binding posts is provided in proximity to the drive motor and these are identified by the reference characters 3a, 3b, 3c, and 3d. The cable assembly 2 shown beneath the binding posts may include a plurality of electrical conductors which are connected respectively to binding posts 3a, 3b and 3c.

A multiconductor conduit 8 serves to convey input power to drive motor 1, via terminals 3a, 3b and 3c. A resistor 9 is connected across the binding posts 3a and 3d, and a capacitor 10 is connected across the binding posts 3d and 3c. The resistor may comprise a 750 ohm wire wound resistor having approximately 10 watts dissipation capacity, and the capacitor 10 may comprise a 1.0 microfarad capacitor employing a Myler dielectric. The output torque from the motor 1 is delivered to a gear and hub assembly 11 as shown most clearly in Figure 2. The gear and hub assembly is, of course, directly coupled to the drive motor to rotate therewith.

Torque is received and transmitted from the assembly 11 by means of a first gear assembly generally indicated in Figure 2 by the reference numeral 12. The first gear assembly includes a spur gear 12a which meshes with the gear in the assembly 11. The spur gear 12a is provided with a grooved spline shaft 12b which is affixed thereto and rotates concentrically therewith.

Torque is received from the first gear assembly 12 by a low speed gear assembly which is indicated generally by the reference numeral 13. The low speed assembly includes a gear 13a which engages with and receives torque from the spline shaft 12b. This assembly also includes a grooved spline shaft 13b which is affixed to the gear 13a to rotate concentrically on a common shaft therewith.

The output torque made available by the low speed gear assembly 13 is utilized by a gear and shaft assembly indicated generally by the numeral 14. This gear and shaft assembly includes a reduction gear 14a which is maintained in gearing engagement with the grooved spline shaft 13b of the low speed gear assembly. An annular hub 14b is integrally connected to and rotates with the reduction gear 14a. A clutch spring 14c encircles the outer periphery of the annular hub 14b.

Slightly to the left of the gear and shaft assembly 14 there is illustrated a clutch output gear and shaft assembly which is generally identified by the numeral 15. This clutch output assembly includes an output gear 15a provided with annular hubs 15b and 15c integrally extending from the right and left sides, respectively thereof. It will be observed that the clutch spring 14c which encircles the periphery of the annular hub 14b of the gear and shaft assembly also encircles the hub 15b on the right of the clutch output assembly. To the left of the assembly 15 the numeral 16 is used to indicate generally a high speed pinion. The high speed pinion is made up of a gear 16a which is integrally connected to an annular hub 16b. A clutch spring 16c resiliently engages the periphery of the annular hub 16b on the high speed pinion, as well as the annular hub 15c of the clutch output assembly. In operation, rotation of drive motor 1 in a first direction, causes torque to flow through spline shaft 12b, gear 13a, spline shaft 13b and reduction gear 14a. This direction of rotation acts to tighten the clutch spring 14c, and transmit a turning moment to the output gear 15a. For rotation of the drive motor in the opposite direction, torque is caused to flow through spur gear 12a and gear 16a. This direction of rotation acts to tighten the clutch spring 16c, and transmit a turning moment to the output gear 15a.

Torque which is delivered to the clutch output assembly 15 by either of these methods appears as a turning moment at the periphery of the output gear 15a. This turning moment is received and exploited by a gear and shaft assembly identified generally by the reference numeral 17. The assembly 17 includes a gear member 17a which meshes with the output gear 15a and receives torque therefrom. The assembly also includes a smaller gear 17b which is integrally connected to the gear 17a by means of an elongated interconnecting hub member 17c. The gear and shaft assembly 17 is maintained in transverse alignment by means of a short spacer bushing 18a on the left side, and a long spacer bushing 18b on the right side thereof, respectively.

Mounted directly in front of the gear and shaft assembly there are illustrated five individual gear assemblies. Three of the gear assemblies, identified by numerals 19, 20 and 21, are mounted on an upper shaft 38. Conversely, a pair of gear assemblies 22 and 23 are rotatably journaled on a lower shaft 39. These gear assemblies each comprise a flat annular gear wheel with an elongated toothed hub integrally extending therefrom. The flat annular gear wheel of the lower gear members 22 and 23 meshes with the elongated tooth hub of the upper gear members. The inter-meshing of the individual gear assemblies in this fashion is shown most clearly in Figure 6 of the drawings.

Figure 6:
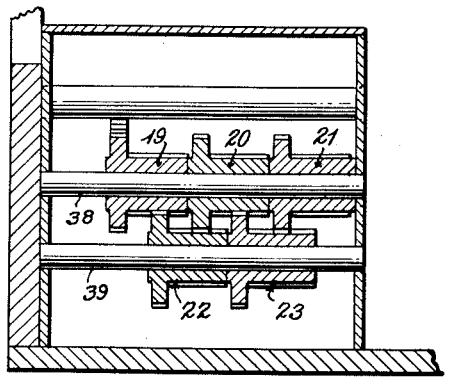
Figure 6 is a sectional view taken along the lines 6—6 in Figure 1, looking in the direction of the arrows, and depicting the relationship between five individual gear members.
Figure 7:
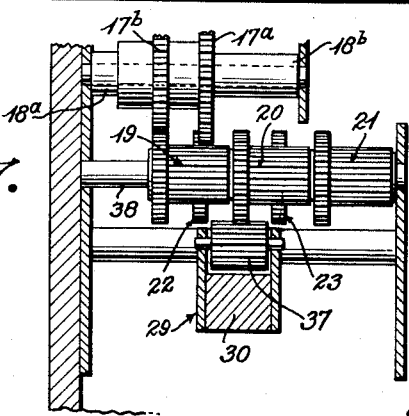
Figure 7 is a sectional view taken along the lines 7—7 in Figure 1, looking in the direction of the arrows, and illustrating the manner in which the pinions in the transmission shift assembly mesh with the individual gear members.

As can be seen from Figure 6, the hub of gear assembly 19 drives gear assembly 22 which in turn drives gear assembly 20. Gear assembly 23 is driven by gear assembly 20 and drives gear assembly 21. The manner in which the gear 17b in the gear and shaft assembly 19 drives the gear wheel of gear assembly 19, and through it the other gear assemblies 20, 21, 22 and 23, is illustrated most clearly in Figure 7. Thus, it is obvious that the flat annular gear wheels of assemblies 19 through 23 all rotate at the same time but each at a different speed.

In Figure 4 of the drawings, the numeral 24 indicates a transmission takeoff pinion gear which extends transversely across the assembly. The appearance of the transmission takeoff pinion gear as an elongated splined cylinder is shown most clearly in Figure 5 of the patent drawings. Returning again to Figure 4, however, torque is received from the takeoff pinion gear 24 by an output drive assembly 25. This output drive assembly includes a spur gear 25a which meshes with the axially splined periphery of the pinion gear 24. An annular hub 25b is integrally affixed to the spur gear 25a and rotates concentrically therewith, as seen most clearly in Figure 2.

Somewhat to the left of the output drive assembly 25 illustrated in Figure 2, there is shown the transmission output assembly 26. This assembly includes an output spur gear 26a integrally connected with the annular hub 26b. A clutch spring 27 resiliently engages the outer periphery of the annular hub 26b and the annular hub 25b. It will be observed that the output drive assembly 25 is journaled for concentric rotation on external torque input shaft 28. The transmission output assembly 26 is keyed to the shaft 28.

Turning momentarily to Figure 4 again for the detailed description of the apparatus used in changing the speed ratios, the numeral 29 indicates generally a transmission shift assembly. This transmission shift assembly may include an obliquely disposed yoke 30 which terminates in a slotted end portion defined between walls 30a and 30b. A front view of the detail of the yoke construction is illustrated in the sectional view provided in Figure 5. At the upper end of the yoke 30, as shown in Figure 4, there is provided a cylindrical end portion 32 extending therefrom. The yoke 30 is arranged for slidable movement along a transmission shaft 31 disposed parallel to the axis of the gear assemblies. Pivotal movement of yoke 30 about shaft 31 is also possible.

A hollow speed selector knob 33 is mounted to slidably engage the cylindrical end portion 32 on yoke 30. This speed selector knob is provided with an annular shoulder 34 which is adapted to nest in an elongated shouldered recess 35. The engagement of the annular shoulder within the recess assists in maintaining the yoke 30 in whichever of the five possible positions is desired. Additionally, five adjacent arcuate portions which form the scalloped arrangement shown below the selector knob in Figure 3 assist in retaining the shift assembly in the desired position. A compression spring 36, which is positioned within the hollow selector knob 33, serves to resiliently bias the assembly in the desired position.

At the lower end of yoke 30 there is provided an upper pinion gear 37a which meshes with a lower pinion gear 37b. These pinion gears are journaled for rotation between the walls 30a and 30b which define the slot in the yoke.

In operation, five separate and distinct speed ratios are obtainable for each direction of rotation of the drive motor 1, forward and backward. More particularly, the upper pinion 37a may be positioned to bridge between the elongated pinion gear 24 and the larger gear wheel of any of the upper gear assemblies 19, 20 or 21 which, it will be remembered, each turn at a different speed. Or the lower pinion 37b may be positioned to bridge pinion gear 37a driving the elongated pinion 24 and the larger gear wheel of either of the lower gear assemblies, 22 or 23, each of which it will be remembered, rotate at still different speeds. In Figure 1, it will be observed that the gear assembly 19 is driving the spur gear 25a via the upper pinion 37a and the transmission takeoff pinion gear 24. From the drawings it will now be appreciated that the transmission shift assembly 29 may be shifted laterally to cause gear 37a to engage the gear wheels of any of the upper three individual gear assemblies or, alternatively, to cause gear 37b to engage the gear wheel of either of the lower individual gear assemblies 22 or 23. In the latter two positions the torque is transmitted via the gear train 37b, 37a, 24 and 25a and although gear assemblies 22 and 23 turn in the opposite direction from gear assemblies 19, 20 and 21, pinion gear 24 will rotate in the same direction as before because of the extra gear 37b in the train.

Summarizing now the features of the transmission mechanism of the present invention the advantages of a graphic recorder providing ten different chart speeds, all from the same internal motor and available without changing gear ratios by physically removing and substituting gear pairs as is necessary in many present recorders of this type, are obvious. For example, with the drive motor 1 turning in one direction to drive the transmission through gear assemblies 13 and 14, the operator may select any one of five chart speeds, say 0.75, 1.5, 3, 6 or 12 inches per hour by merely moving the selector knob 33 to the proper position. Further, he may change from any one of these charts speeds to another without turning the drive motor off or interrupting the record. Still further, the operator may reverse the drive motor 1 to drive the transmission through gear assembly 16 and select any one of 5 other chart speeds, say 0.75, 1.5, 3, 6 or 12 inches per minute with the same selector knob 33. Another feature of the transmission of the present invention is the provision for external chart drive allowing the recorder to be synchronized with other mechanisms. This external drive is applied to the shaft 28 to which is keyed the transmission output assembly 26. The external driving means need not be powerful enough to drive the entire transmission, since the transmission from the output assembly 26 back to the internal motor is disengaged from the chart drive by the action of spring clutch 27 when drive is from an external source to the shaft 28.

Although it will now be evident from the above detailed description that I have disclosed my novel transmission assembly in such full, clear and concise terms as the statute requires, it will be equally obvious that many substitutions, modifications and alterations may be made without departing in any manner from the spirit and scope of the appended claims.

What I claim is:

1. In a multispeed transmission, a transmission output assembly including an output gear integrally joined with an annular hub, a spur gear integrally joined with an annular hub and journaled for rotation with said output gear on a common shaft, first tensile biasing means mounted to engage the outer periphery of said annular hubs, a yoke mounted for slidable movement in a plane parallel to said common shaft, second tensile biasing means mounted to maintain said yoke in a predetermined position, a transmission takeoff pinion gear disposed parallel to said shaft and mounted to mesh with said spur gear, a group of intermeshing gear assemblies mounted to receive a supply of driving torque, and meshing pinion gears journaled in said yoke for selective rotational engagement with one of said gear assemblies to transfer driving torque to said takeoff pinion gear therefrom.

2. In a multispeed transmission for traversing a record strip at a plurality of speeds, a first group of axially aligned intermeshing gear assemblies, means including clutch means for driving one of said gear assemblies, a second group of axially aligned gear assemblies mounted to mesh and rotate with said first group, a transmission output assembly including an output spur gear for applying tractive force to a device for accomplishing said traversing of said record strip, a transmission shift assembly including a yoke mounted to slide parallel to the axes of said gear assemblies and said transmission output assembly, and means including a plurality of meshing pinion gears journaled within said yoke for selectively transferring torque from any of said gear assemblies to said transmission output assembly.

3. A multispeed transmission device for supplying tractive force to a recording medium which includes reversible drive means adapted to supply torque in either of two directions, a shaft, a high speed pinion rotatably mounted on said shaft, a reduction gear journaled for rotation on said shaft independent of said pinion, means including gearing means for delivering torque to said pinion and said reduction gear from said drive means, an output gear spatially interposed between said pinion and said reduction gear and resiliently coupled therebetween for rotation on said common shaft selectively with said pinion or said reduction gear in response to the direction of output torque supplied by said drive means, and means including a transmission output assembly for selectively making torque available at a plurality of different speeds for utilization as said tractive force.

4. In a multispeed transmission adapted to receive torque from a reversible motor, means including clutch means for providing a unidirectional supply of torque; first, second and third individual gear assemblies each comprising an annular gear wheel integrally joined with an axially extending tooth hub, said assemblies journaled for rotation on a common shaft and driven by said means for providing torque; fourth and fifth gear assemblies each comprising an annular gear wheel integrally joined with an axially extending tooth hub and journaled for rotation on a common shaft, said annular gear wheels of said fourth and fifth gear asemblies meshing with said toothed hubs of said first and second gear assemblies, respectively; a transmission output assembly, a yoke provided with a slotted end portion and mounted to slide in a plane parallel to the axis of said gear assemblies, a pair of meshing pinion gears journaled for rotation within said slotted end portion, whereby said output assembly is caused to revolve at any of five separate and distinct speeds by sliding said yoke to engage said pinions with said gear wheels of said individual gear assemblies.

5. In a multispeed transmission, a gear and hub assembly, a drive motor connected to receive electric energy and supply output torque to said gear and hub assembly in response thereto, a first gear assembly mounted to receive torque from said gear and hub assembly; a low speed gear assembly and a high speed pinion mounted, respectively, to receive torque from first and second portions of said first gear assembly, a first gear and shaft assembly mounted to receive torque from said low speed gear assembly, an output gear journaled for concentric rotation with and between said high speed pinion and said low speed gear assembly and resiliently biased for rotation with either of same, a second gear and shaft assembly rotatably mounted in meshing engagement with said output gear, at least five individual gear assemblies mounted in meshing engagement for simultaneous rotation with said second gear and shaft assembly, a transmission output assembly, and means including a transmission shift assembly for conveying torque from any of said individual gear assemblies to drive said transmission output assembly.

6. In a multispeed transmission, a shaft, a high speed pinion freely rotatably mounted on said shaft, a reduction gear mounted on said shaft for free rotation independent of said pinion, a clutch output gear mounted on said shaft between said reduction gear and said pinion, first and second clutch springs mounted to engage the periphery of adjacent portions extending from said pinion and said reduction gear respectively, a plurality of intermeshing individual gear assemblies mounted to rotate responsive to rotation of said output gear, a transmission output assembly mounted to deliver a unidirectional torque, and means including a transmission shift assembly for supplying torque from any one of said individual gear assemblies to said transmission output assembly.

7. In a multispeed transmission, a gear and hub assembly, a drive motor connected to receive electric energy and supply output torque to said gear and hub assembly in response thereto, a first gear assembly mounted to receive torque from said gear and hub assembly; a low speed gear assembly and a high speed pinion mounted, respectively, to receive torque from first and second portions of said first gear assembly, a first gear and shaft assembly mounted to receive torque from said low speed gear assembly, an output gear journaled for concentric rotation with and between said high speed pinion and said low speed gear assembly and resiliently biased for rotation with either of same, a second gear and shaft assembly rotatably mounted in meshing engagement with said output gear, at least five individual gear assemblies mounted in meshing engagement for simultaneous rotation with said second gear and shaft assembly, a transmission output assembly comprising an output spur gear integrally joined with an annular hub and an external torque input shaft, a drive gear integrally joined with an annular hub and journaled on said external torque input shaft, and tensile biasing means mounted on the outer periphery of said annular hubs; and means including a transmission shift assembly for conveying torque from any of said individual gear assemblies to said transmission output assembly, whereby said drive gear and hub of said transmission output assembly are disengaged from said output spur gear and hub when driving torque is supplied from said external torque input shaft.

References Cited in the file of this patent

UNITED STATES PATENTS

| | | |
|---|---|---|
| 2,496,572 | Williams | Feb. 7, 1950 |
| 2,788,681 | Kling | Apr. 16, 1957 |